US012540808B2

(12) United States Patent
Kling E Silva et al.

(10) Patent No.: US 12,540,808 B2
(45) Date of Patent: Feb. 3, 2026

(54) INTERNAL INSPECTION DEVICE FOR DETERMINING A LENGTH OF A TUBULAR GOOD

(71) Applicant: VALLOUREC OIL AND GAS FRANCE, Aulnoye-Aymeries (FR)

(72) Inventors: Lucas Kling E Silva, Meudon (FR); Sébastien Petit, Meudon (FR); Alastair Brodie, Meudon (FR); Nicolas Wilbert, Meudon (FR); Nestor Medeiros, Meudon (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 508 days.

(21) Appl. No.: 18/040,201

(22) PCT Filed: Jul. 28, 2021

(86) PCT No.: PCT/EP2021/071182
§ 371 (c)(1),
(2) Date: Feb. 1, 2023

(87) PCT Pub. No.: WO2022/028989
PCT Pub. Date: Feb. 10, 2022

(65) Prior Publication Data
US 2023/0280146 A1    Sep. 7, 2023

(30) Foreign Application Priority Data
Aug. 4, 2020   (EP) .................................... 20189459

(51) Int. Cl.
*G01B 5/04*      (2006.01)
*F16L 55/32*     (2006.01)
(Continued)

(52) U.S. Cl.
CPC .............. *G01B 5/043* (2013.01); *F16L 55/32* (2013.01); *G01B 11/12* (2013.01); *F16L 2101/30* (2013.01)

(58) Field of Classification Search
CPC ......... G01B 5/043; G01B 11/12; F16L 55/32; F16L 2101/30
See application file for complete search history.

(56) References Cited

U.S. PATENT DOCUMENTS 7,768,270 B2 *   8/2010   Brusco ................... G01B 21/08
                                                324/559
8,030,946 B2 *  10/2011   Brusco ................... G01B 21/08
                                                324/559
(Continued)

FOREIGN PATENT DOCUMENTS

CA       2464427 A1 * 10/2003
CN    201359488 Y  * 12/2009
(Continued)

OTHER PUBLICATIONS

International Search Report issued Nov. 5, 2021 in PCT/EP2021/071182 filed on Jul. 28, 2021, 3 pages.

*Primary Examiner* — Yaritza Guadalupe-McCall
(74) *Attorney, Agent, or Firm* — Oblon, McClelland, Maier & Neustadt, L.L.P.

(57) ABSTRACT

This internal inspection device is for determining a length and inner diameter of a tubular good. The internal inspection device includes a first positioning sensor, a second positioning sensor spaced axially from the first positioning sensor, a displacement sensor the displacement of the internal inspection device inside the tubular good between two positions sensed by the respective positioning sensors, the internal inspection device further including a electronic arranged to
(Continued)

Figure 1:
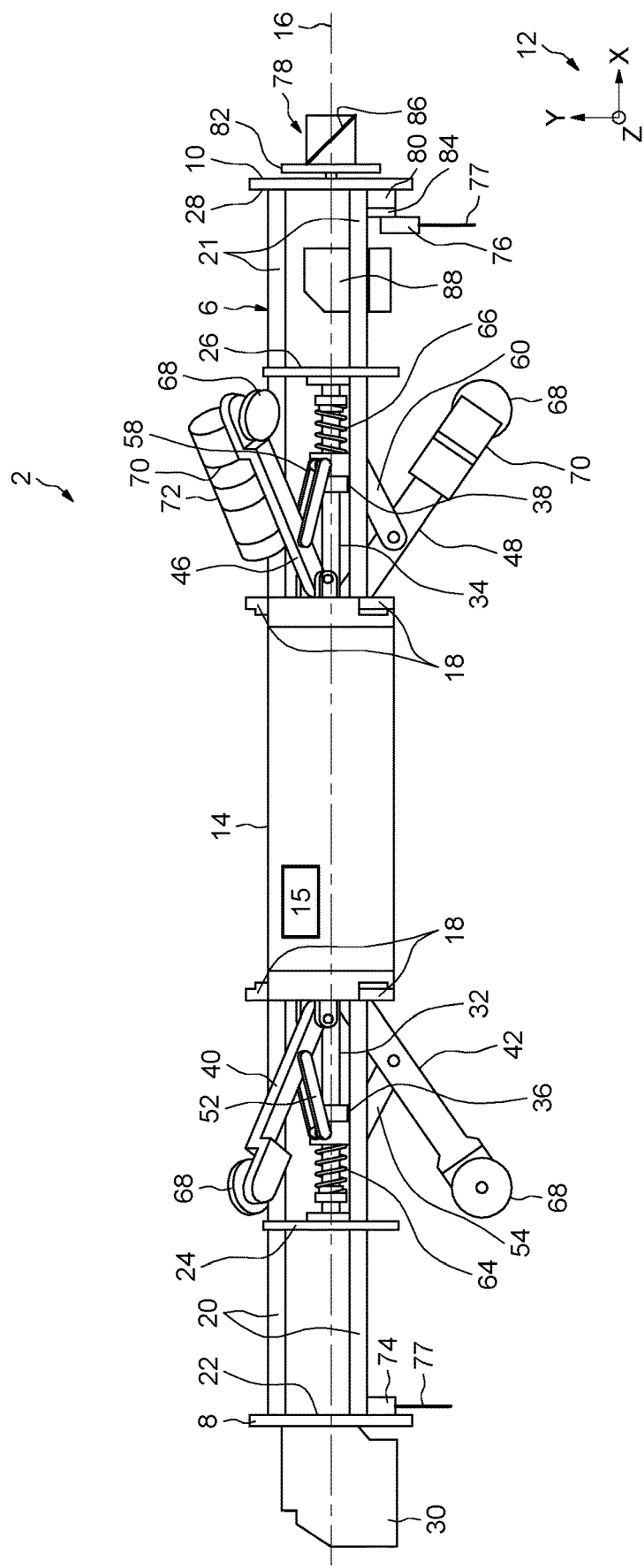

computing the length of the tubular good by adding a distance measured by the displacement sensor and a predetermined length.

16 Claims, 4 Drawing Sheets

(51) Int. Cl.
*G01B 11/12* (2006.01)
*F16L 101/30* (2006.01)

(56) References Cited

U.S. PATENT DOCUMENTS

| | | | | |
|---|---|---|---|---|
| 8,925,213 | B2* | 1/2015 | Sallwasser | E21B 47/08 33/544.2 |
| 11,560,977 | B2* | 1/2023 | Duncan | F16L 55/32 |
| 11,585,480 | B2* | 2/2023 | Duncan | F16L 55/30 |
| 11,598,474 | B2* | 3/2023 | Duncan | F16L 55/30 |
| 11,796,116 | B2* | 10/2023 | Duncan | F16L 55/30 |
| 2003/0189713 | A1 | 10/2003 | Lam et al. | |
| 2018/0017376 | A1 | 1/2018 | Moore | |
| 2018/0135974 | A1 | 5/2018 | Stigall et al. | |
| 2019/0017809 | A1* | 1/2019 | Moore | G01B 11/10 |
| 2019/0063906 | A1* | 2/2019 | Stigall | G01B 11/245 |
| 2020/0378754 | A1 | 12/2020 | Stigall et al. | |
| 2023/0280146 | A1* | 9/2023 | Kling E Silva | F16L 55/32 33/775 |

FOREIGN PATENT DOCUMENTS

| | | | | |
|---|---|---|---|---|
| CN | 110260094 A | * | 9/2019 | G01C 9/00 |
| WO | WO-2018089871 A1 | * | 5/2018 | G01B 17/06 |

* cited by examiner

INTERNAL INSPECTION DEVICE FOR DETERMINING A LENGTH OF A TUBULAR GOOD

The present invention relates to the technical field of internal inspection and/or measurement devices for determining internal parameters of a tubular good, in particular in the technical field of oil country tubular goods.

In order to make sure that a tubular good is properly manufactured, it is known to pass a caliber through the tubular good in order to evaluate if the inner space in the tubular good allow passage of equipment of a certain dimension.

Also, separate operations may be conducted to measure internal diameters of the tubular goods at different positions along said tubular goods.

Then, another equipment may be used to measure the length of the tubular good. Knowing with accuracy the length of the tubes leads to better installations, better positioning of equipment, for example in an oil and gas well. Known methods to measure the length of a tubular good relies typically on metal tapes or laser devices operating from one end to another end of the tubular good Although such solutions allow measuring several parameters of a tubular good, the accuracy of the measure is not optimal. Namely, typical known accuracy for the length measurement with the precited methods is at best 15 mm. It is desired to improve said accuracy.

The invention aims at overcoming the above-mentioned drawbacks.

More specifically, the invention aims at allowing to measure internal parameters of a tubular good with an improved accuracy.

According to a first aspect of the invention, it is proposed an internal inspection device for determining a length of a tubular good, the device including a first positioning sensor, a second positioning sensor spaced axially from the first positioning sensor, wherein the first positioning sensor is so configured to determine whether the first positioning sensor is located inside the tubular good (4) and/or the second positioning sensor is so configured to determine whether the second positioning sensor is located inside the tubular good (4), a displacement sensor measuring the displacement of the internal inspection device inside the tubular good between a first position and a second position, the internal inspection device further including a electronic arranged to compute the length of the tubular good by adding a distance measured by the displacement sensor and a predetermined length.

Such an internal inspection device allows determining the length of the tubular good with a better accuracy, of down to about plus or minus 3 mm whereas the prior art devices allow determining the length within a tolerance range of 15 mm.

One may also foresee an actuator for displacing the internal inspection device inside the tubular good.

In one embodiment, the first and/or the second positioning sensor includes a distance sensor directed towards a radial direction. Such a feature is preferable as it is easier to implement in a device than having sensors oriented in an oblique manner in relation to the axis of the tube, as it is necessary in this case to take account of internal dimensions of the tubular to compute a length to add to the distance measured by the displacement sensor.

In one embodiment, the internal inspection device is elongated, the first positioning sensor is located on a first end side of the elongated internal inspection device, and the second positioning sensor is located on the other end side of the elongated inspection device, the predetermined length being the distance between the first and second positioning sensors. The first and second positioning sensors may be located proximate to each respective ends of the internal inspection device.

The so-designed internal inspection device allows obtaining a maximal accuracy of the measure of the length of the tubular good.

One may also foresee a metering device of an inner diameter of the tubular good.

In another embodiment, the metering device includes a laser triangulation sensor and a plate pivoting around an axial direction.

Preferably, the metering device includes an inclined mirror mounted on the plate.

Such a sensor allows accurately determining the inner diameter of the tubular good while avoiding it to be excessively costly.

In another embodiment, the laser triangulation sensor is mounted on the plate, the metering device preferably including another laser triangulation sensor mounted on the plate, the laser triangulation sensors being diametrically opposed to each other.

Such a metering device increases even more the accuracy of the inner diameter determination.

Preferably, the triangulation sensor includes a laser line emitter.

Such a laser sensor allows determining the inner diameter in a more accurate manner.

Since the same internal inspecting device may be used for performing two measures at the same time, the work of an operator in charge of internal inspecting of a tubular good is rendered easier and faster.

In another embodiment, the displacement sensor includes a length encoder. The length encoder may be a length optical encoder.

One may also foresee at least one rolling element for displacing the internal inspection device inside the tubular good, the at least one rolling element being intended to be in contact with an inner surface of the tubular good, the length encoder being linked with the rolling element.

Hence, an actuator for displacing the internal inspection device inside the tubular good and a displacement sensor measuring the displacement are both provided in a relatively cheap manner.

One may also foresee an arm, a sliding part and an elastic element, the arm being able to pivot around a direction perpendicular to an axial direction, the rolling element being attached to an end of the arm, the sliding part being moveable in translation along the axial direction and mechanically linked to the arm, the elastic element being so arranged to recall the sliding part towards a position causing the arm to tend to move radially outwards.

By virtue of this arrangement, the device may adapt easily to different kinds of tubular goods, particularly, the device is adapted to a variety of nominal internal diameters.

In another embodiment, the displacement sensor is so configured to measure a distance between a first position wherein the first positioning sensor starts detecting that it is inside the tubular good and a second position wherein the second positioning sensor starts detecting that it is outside the tubular good. In other words, the first positioning sensor triggers the first position when the first positioning sensor starts detecting an inside surface of the tubular good and the second positioning sensor triggers the second position when the second positioning sensor ends detecting an inside surface of the tubular good.

This enables to know during the inspection of the tubular good when the internal inspection device is partially or totally inside the tubular good.

Preferably, the first position is triggered by the first positioning sensor and the second position is triggered by the second positioning sensor.

In another embodiment, the first positioning sensor triggers the first position when the first positioning sensor starts detecting an inside surface of the tubular good and the second positioning sensor triggers the second position when the second positioning sensor ends detecting an inside surface of the tubular good.

According to another aspect of the invention, it is proposed an internal inspection method of a tubular good, wherein an internal inspection device as defined above is displaced inside the tubular good, a first position is triggered by the first positioning sensor, a second position is triggered by the second positioning sensor, a distance is measured by the displacement sensor and a length of the tubular good is calculated by adding the distance measured by the displacement sensor and a predetermined length.

Figure 2:
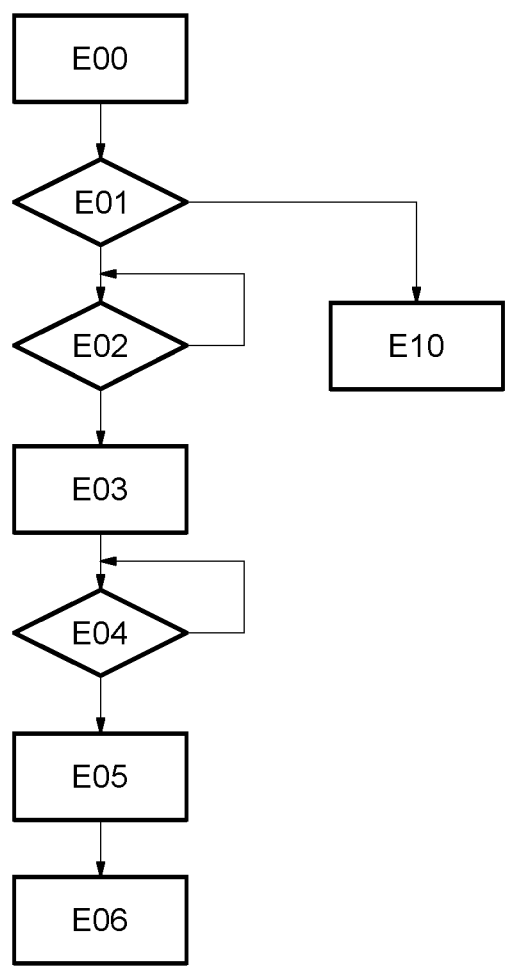
Figure 3A:
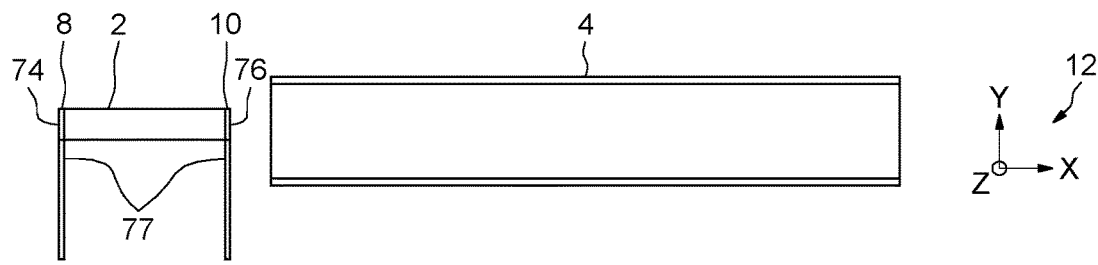
Figure 3B:
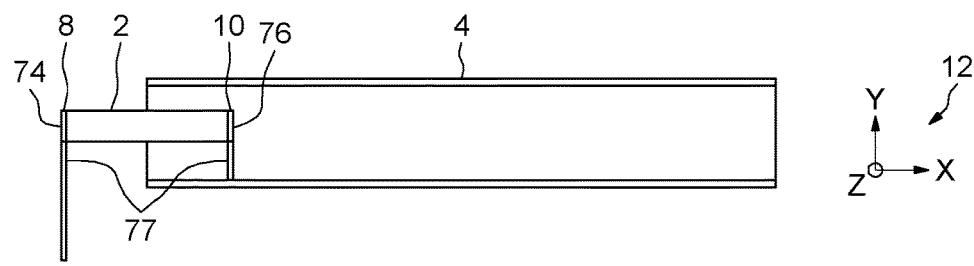
Figure 3C:
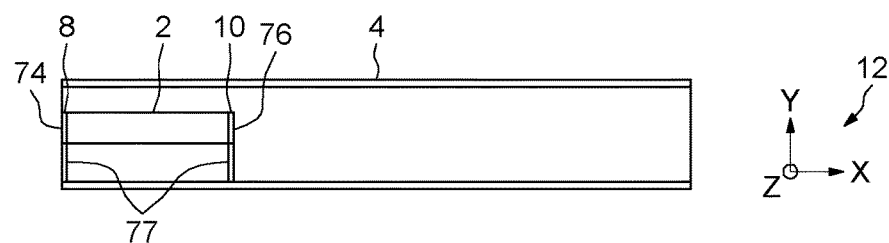
Figure 3D:
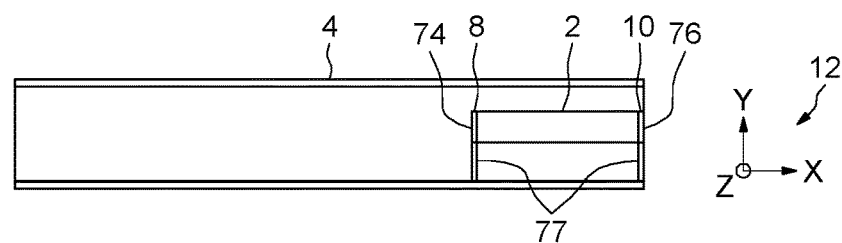
Figure 4:
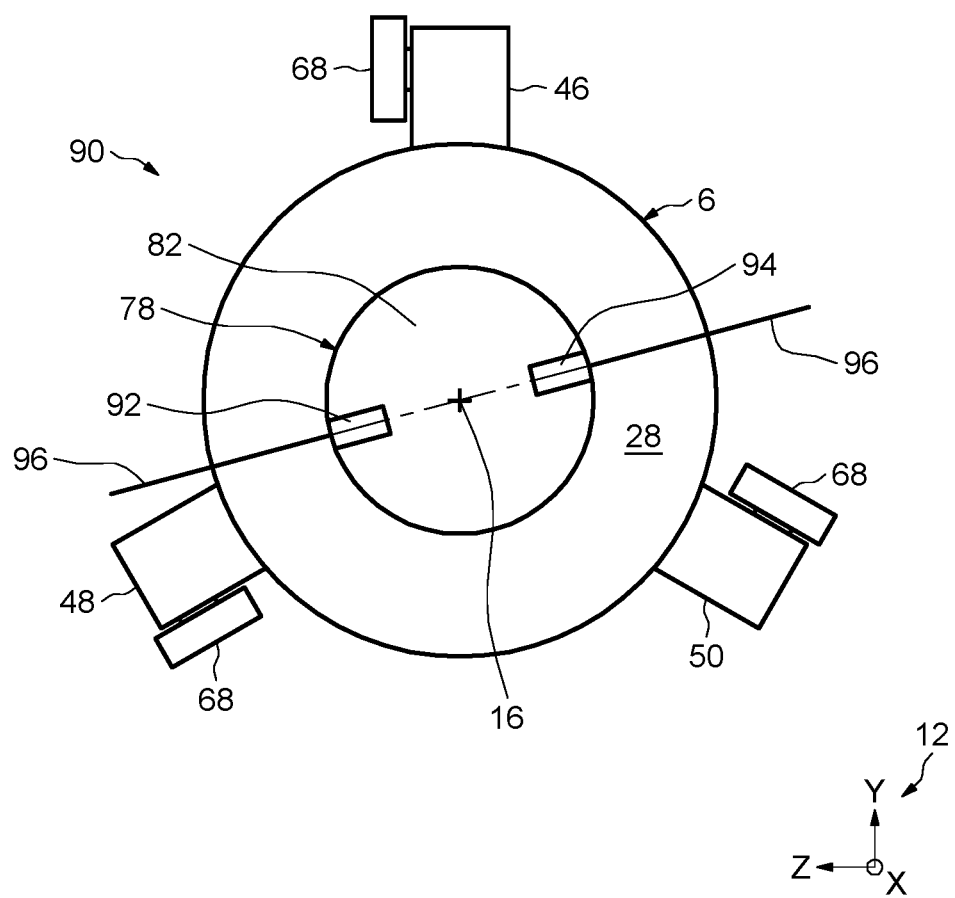

The present invention and its advantages will be better understood by studying the detailed description of specific embodiments given by way of nonlimiting examples and illustrated by the appended drawings on which:

FIG. 1 is a side view of an internal inspection device according to an aspect of the invention, FIG. 2 is a flowchart illustrating an internal inspection method according to another aspect of the invention, FIGS. 3A, 3B, 3C and 3D show the internal inspection device of FIG. 1 in several steps of the method illustrated by FIG. 2, and FIG. 4 is a detailed view of a metering device of an internal inspection device according to a second embodiment of the invention.

With reference to FIG. 1, it is schematically depicted an internal inspection device 2. The internal inspection device 2 aims at implementing internal inspection on a tubular good 4 (depicted in FIGS. 3A to 3D), such as controlling the roundness and the traversability of the tubular good 4, measuring the length $L_4$ of the tubular good 4 or measuring the inner diameter $d_4$ of the tubular good 4.

The internal inspection device 2 includes a main part 6. The main part 6 is elongated and includes two opposite ends 8 and 10.

It is defined an orthonormal direct vector basis 12 attached to the main part 6. The basis 12 consists of a vector X, a vector Y and a vector Z. The vector X is parallel to the longitudinal direction of the main part 6.

In the present application, the word "cylindrical" and variations thereof will be understood according to its common definition, being namely that a cylindrical surface is a surface consisting of all the points on all the lines which are parallel to a given line and which pass through a fixed plane curve in a plane not parallel to the given line.

The main part 6 includes a body 14. The body 14 accommodate electronics 15 required for controlling actuators of the internal inspection device. The body 14 is a cylinder of revolution around an axis 16 and having a diameter $d_{14}$.

In the present application, the terms "axial", "radial", "tangential" and variations thereof will be understood referring relative to the axis 16.

The body 14 includes a plurality of, e.g. six attachment part 18. The attachment parts 18 aim at attaching a cylindrical mandrel (not depicted) intended to implement a drifting operation inside the tubular good 4. By means of the cylindrical mandrel attached to the body 14 via the attachment parts 18, the roundness and/or the traversability of the tubular good 4 may be controlled. The diagnostic of "traversability" verifies that a calibration body whose characteristics are well determined may pass through the tube either from end to end, or more simply on one or more tube segments.

The main part 6 includes a plurality of, e.g. three structural rods and a plurality of, e.g. three structural rods 21 attached to the body 14. The structural rods 20 and 21 are cylindrical along the direction of the vector X. In the depicted embodiment, the structural rods 20 and 21 are cylinders of revolution having the same diameter $d_{20}$. The cylindrical rods 20 and the cylindrical rods 21 are respectively located on each side of the body 14.

The main part 6 includes two structural plates 22 and 24 secured to the structural rods 20. The structural plate 22 is positioned proximate to the end 8. The structural plate 24 is located axially between the structural plate 22 and the body 14. The main part 6 includes two structural plate 26 and 28. The structural plate 28 is positioned proximate to the end 10. The structural plate 26 is located axially between the structural plate 28 and the body 14. The plates 22, 24, 26 and 28 are cylinders of revolution around the axis 16 and having the diameter $d_{14}$.

Proximate to the end 8, the internal inspection device 2 includes a battery 30. The battery 30 is electrically linked to the body 14 so as to provide the electronics 15 with electrical energy.

The main part 6 includes two cylindrical rods 32 and 34. The rods 32 and 34 form two cylinders of revolution around the axis 16 and have a same diameter $d_{32}$. The cylindrical rod 32 includes a first end attached to the structural plate 24 and a second end attached to the body 14. The cylindrical rod 34 includes a first end attached to the body 14 and a second end attached to the structural plate 26.

The internal inspection device 2 includes two sleeves 36 and 38 respectively mounted on the cylindrical rods 32 and 34. The sleeves 36 and 38 are moveable in translation about the direction of the vector X with respect to the respective rods 32 and 34.

The internal inspection device 2 includes a plurality of, e.g. six pivoting arms 40, 42, 44, 46, 48 and 50. The pivoting arm 44 is hidden on FIG. 1 by the pivoting arms 40 and 32, and the pivoting arm 50 is hidden on FIG. 1 by the pivoting arms 46 and 48.

The pivoting arms 40, 42 and 44 are mechanically linked to an end of the body 14 proximate to the end 8. More specifically, each pivoting arm 40, 42, 44 is able to pivot, with reference to the body 14, around a tangential axis. The pivoting arms 46, 48 and 50 are mechanically linked to an end of the body 14 proximate to the end 10. More specifically, each pivoting arm 46, 48, 50 is able to pivot, with respect to the body 14, around a tangential axis. The tangential axes of the respective pivoting movements of the pivoting arms 40, 42 and 44 form an angle of 120° between each other, and the tangential axes of the respective pivoting movements of the pivoting arms 46, 48 and 50 form an angle of 120° between each other.

The internal inspection device 2 includes six connecting rods 52, 54, 56, 58, 60 and 62. The connecting rods 56 and 52 are hidden on FIG. 1 for the same reasons as the pivoting arms 44 and 50. The connecting rods 52, 54 and 56 have an end mechanically linked to the sleeve 36. The other end of the connecting rods 52, 54, 56 is respectively linked to the pivoting arm 40, 42, 44. The connecting rods 58, 60 and 62 have an end mechanically linked to the sleeve 38. The other end of the connecting rods 58, 60, 62 is respectively linked to the pivoting arm 46, 48, 50.

The internal inspection device 2 includes two springs 64 and 66. The spring 64 is mounted on the cylindrical rod 32 between the structural plate 24 and the sleeve 36. The spring 66 is mounted on the cylindrical rod 34 between the structural plate 26 and the sleeve 38. The springs 64 and 66 are so configured to work in compression. Hence, the springs 64 and 66 may push the respective sleeves 36 and 38 towards the body 14, deploying the pivoting arms 40, 42, 44, 46, 48, 50 radially outwards. Thus, the internal inspection device may be substantially centered into the tubular good.

Each pivoting arm 40, 42, 44, 46, 48, 50 includes, at its end opposite to the one attached to the body 14, a wheel 68. The wheel 68 may be replaced with any rolling element such as a ball or a roller, or with a sliding element. The wheels 68 are intended to be in radial contact with an inner surface of the tubular good 4. By virtue of this arrangement, when the springs 64 and 66 push the sleeves 36 and 38 towards the body 14, they move the wheels 68 radially outwards.

The internal inspection device 2 includes two electric motors 70. The electric motors 70 are respectively mounted on the pivoting arms 46 and 48. The electric motors 70 are mechanically coupled to the wheels 68 of the corresponding pivoting arm 46 and 48. By virtue of this arrangement, the electric motors 70 may drive the wheels 68 of the pivoting arms 46 and 48. It is thus provided an actuator for displacing the internal inspection device 2 inside the tubular good 4.

The internal inspection device 2 includes a length encoder 72. The length encoder 72 is an optical encoder and is mounted on the pivoting arm 46. The length encoder 72 is mechanically coupled to the wheel 68 of the corresponding pivoting arm 46. More specifically, in a known manner per se, the length encoder 72 is able to measure the rotation of the wheel 68, and encoder electronic is able to convert this rotation into a displacement of the internal inspection device 2 inside the tubular good 4.

The internal inspection device 2 includes two positioning sensors 74 and 76 respectively attached to the structural plates 22 and 28. The two positioning sensors 74, 76 are spaced axially one from the other. The two positioning sensors 74, 76 are so configured to determine whether they respectively are inside the tubular good 4. In the depicted embodiment, the positioning sensors 74 and 76 are distance sensors, e.g. laser distance sensors. More specifically, the laser distance sensors 74 and 76 are directed towards the radial direction. In other words, the laser distance sensors 74 and 76 emit a laser beam 77 towards a radial direction and detect the reflection of the laser beam 77. Hence, when the laser sensors 74 and 76 are within the tubular good 4, they may measure a distance between the laser sensors 74 and 76 and an inner surface of the tubular good 4. When the laser sensors 74 and 76 are outside the tubular good 4, they detect a laser beam reflection coming much later than when the laser sensors 74 and 76 are within the tubular good 4, or they detect no laser beam reflection at all. In other words, when the laser distance sensor 74 or 76 is outside the tubular good 6, it detects no significative measure. Hence, the positioning sensor 74 is able to detect if the positioning sensor is inside the tubular good, and therefore the positioning sensor is able to determine whether the end 8 is located inside the tubular good 4 and the positioning sensor 76 is able to determine whether the end 10 is located inside the tubular good 4.

The internal inspection device 2 may further includes a metering device 78. The metering device 78 is located proximate to the end 10.

The metering device 78 includes an electric motor 80 and a plate 82 driven by the electric motor 80 in rotation around the axis 16 with respect to the main part 6. An encoder 84 allows having permanently a measure of the angular position of the plate 82. The encoder 84 may be a revolution encoder. The encoder 84 may be a revolution optical encoder.

The metering device 78 includes an inclined mirror 86. The mirror 86 is supported by the plate 82. Namely, the mirror 86 is substantially plane and forms an angle about 45° with respect to the axis 16.

The metering device 78 comprises a laser triangulation sensor 88 able to emit a laser beam along the axis 16. The laser beam reflects in the mirror 86 and is thus radially directed. Then, the laser beam may reflect against an inner cylindrical surface of the tubular good 4, then revert back into the mirror 86, be directed along the axis 16 and be detected by the laser triangulation sensor 88. By virtue of this arrangement, the distance between the axis 16 and the point of reflection of the laser beam on the inner surface of the tubular good 4 may be measured. Thus, the inner diameter $d_4$ may be determined with accuracy.

In the depicted embodiments, the laser sensors 74, 76 and 88 are laser line emitters. Hence, the accuracy of the distance measurements by means of these sensors is even more increased.

In a variation, the metering device 78 may replace one of the positioning sensors.

With reference to FIG. 2, it will now be described an internal inspection method of the tubular good 4.

The internal inspection begins with the internal inspection device 2 arranged next to an end of the tubular good 4, as depicted on FIG. 3A.

The internal inspection method includes a first step E00 wherein the internal inspection device 2 is inserted, for instance by an operator, inside the tubular good 4. More specifically, as depicted on FIG. 3B, the end 10 is inserted in the tubular good 4. Nevertheless, one could without departing from the scope of the invention insert the internal inspection device 2 by its end 8. At the stage of the method, the output value $out_{76}$ of the positioning sensor 76 substantially equals the diameter $d_4$, that is, in the depicted example, is within a range $0.9*d_4$ to $1.1*d_4$, whereas the output value $out_{74}$ of the positioning sensor 74 is not substantially equal to the diameter $d_4$. The expected value for the diameter $d_4$ may be entered by the operator in the electronics 15 during step E00. Still during step E00, the operator controls the electric motors 70 in such a way that the internal inspection device 2 moves inside the tubular good 4. In the depicted embodiment, the advance speed of the internal inspection device is within 0.1 and 0.3 m/s.

The method further includes a test step E01 wherein the electronics 15 control whether the output $out_{76}$ still substantially corresponds to the diameter $d_4$. If, at step E01, the output $out_{76}$ is no longer substantially corresponding to the diameter $d_4$, an error step E10 is implemented and the method is stopped. Otherwise, another test step E02 is implemented.

At step E02, the electronics 15 control whether the output $out_{74}$ becomes substantially corresponding to the diameter $d_4$. As long as the output $out_{74}$ remains outside the range $0.9*d_4$ to $1.1*d_4$, the step E02 is still implemented. As soon as the output $out_{74}$ substantially corresponds to the diameter $d_4$, which corresponds to the state depicted on FIG. 3C, a step E03 is implemented.

At step E03, the electronics 15 start using the length encoder 72 to measure the distance corresponding to the angular rotation of the wheel 68. In the meantime, the electronics 15 start using the metering device 78 in order to determine the diameter $d_4$.

The method further includes, at test step E04, detecting whether the output $out_{76}$ substantially equals the diameter $d_4$. As long as the output $out_{76}$ remains substantially equal to the diameter $d_4$, the step E04 is implemented. As soon as the output $out_{76}$ becomes smaller than $0.9*d_4$ or larger than $1.1*d_4$, the step E04 ends and one implement a step E05.

At step E05, the electronics 15 control the length encoder 72 to stop measuring the distance corresponding to the rotation of the wheels 68. The position of the internal inspection device 2 at step E05 is depicted on FIG. 3D.

The method further includes, at step E06, calculating a distance $L_4$ which corresponds to the length of the tubular good 4. More specifically, at step E06, the electronics 15 collect the distance $d_{72}$ measured by the length encoder 72 between steps E03 and E05. Then, the electronics 15 collect a predetermined length 12 previously stored in a memory. More specifically, the predetermined length 12 equals the axial offset between the positioning sensors 74 and 76. Then, the electronics 15 calculate the length $L_4$ by adding the distance $d_{72}$ and the length 12:

$$L_4 = d_{72} + l_2$$

Hence, one may obtain the length $L_4$ of the tubular good 4 with an accuracy of ±3 mm. Furthermore, by means of the internal inspection device 2, the inner diameter $d_4$ of the tubular good 4 may be measured with accuracy, the roundness and the traversability of the tubular good 4 may be controlled and all these operations may be implemented with a single passage of the internal inspection device 2 through the tubular good 4. Without departing from the scope of the invention, one may use the positioning sensor 76 for measuring the diameter $d_4$ and/or use the metering device for determining whether the end 10 is within the tubular good 4. That is, an alternative internal inspection device may be provided without the positioning sensor 76 or an alternative internal inspection device may be provided without the metering device 78.

Referring now to FIG. 4, an internal inspection device 90 according to a second embodiment of the invention is depicted. Same elements have the same references.

The internal inspection device 90 differs from the internal inspection device 2 in that the metering device 78 includes, instead of the laser triangulation sensor 88 and of the inclined mirror 86, a laser triangulation sensor 92 affixed to the plate 82. The laser sensor 92 is so arranged to emit a radially directed laser beam 96. Thus, the internal inspection device 90 provides an alternative arrangement for the measure of the diameter $d_4$.

In the embodiment depicted on FIG. 4, the internal inspection device 90 includes one supplementary laser triangulation sensor 94. The laser beam 96 emitted by the laser sensor 94 is radially directed and in opposite direction to that of the laser beam emitted by the laser sensor 92. The measure of the diameter $d_4$ is thus rendered even more accurate.

The invention claimed is:

1. An internal inspection device for determining a length of a tubular good, the internal inspection device comprising:
    a body having an axis;
    a first positioning sensor;
    a second positioning sensor spaced axially from the first positioning sensor, wherein the first positioning sensor is configured to determine whether the first positioning sensor is located inside the tubular good and the second positioning sensor is configured to determine whether the second positioning sensor is located inside the tubular good;
    a displacement sensor for measuring the displacement of the internal inspection device inside the tubular good along a length of the tubular good between a first position within the tubular good and a second position within the tubular good; and
    electronics including circuitry that computes the length of the tubular good by adding a distance measured by the displacement sensor and a predetermined axial length between the first position sensor and the second position sensor.

2. The internal inspection device according to claim 1, further including an actuator for displacing the internal inspection device inside the tubular good.

3. The internal inspection device according to claim 1, wherein the first and/or the second positioning sensor includes a distance sensor directed towards a radial direction.

4. The internal inspection device according to claim 1, wherein the first positioning sensor and the second positioning sensor are chosen among Optical sensors, Giant magnetoresistance sensors, Hall effect sensors.

5. The internal inspection device according to claim 1, wherein the internal inspection device is elongated, the first positioning sensor being located on a first end side of the elongated internal inspection device, and the second positioning sensor being located on the other end side of the elongated inspection device.

6. The internal inspection device according to claim 1, further including metering device for metering an inner diameter of the tubular good.

7. The internal inspection device according to claim 6, wherein the metering device includes a laser triangulation sensor and a plate pivoting around an axial direction.

8. The internal inspection device according to claim 7, wherein the metering device includes an inclined mirror mounted on the plate.

9. The internal inspection device according to claim 7, wherein the laser triangulation sensor is mounted on the plate, the metering device preferably including an additional laser triangulation sensor mounted on the plate, the two laser triangulation sensors being diametrically opposed to each other.

10. The internal inspection device according to claim 7, wherein the laser triangulation sensor includes a laser line emitter.

11. The internal inspection device according to claim 1, wherein the displacement sensor includes a length encoder.

12. The internal inspection device according to claim 11, further including at least one rolling element for displacing the internal inspection device inside the tubular good, the rolling element being intended to be in contact with an inner surface of the tubular good, the length encoder being linked with the rolling element.

13. The internal inspection device according to claim 12, further including an arm, a sliding part and an elastic element the arm being able to pivot around a direction perpendicular to an axial direction, the rolling element being attached to an end of the arm, the sliding part being moveable in translation along the axial direction and mechanically linked to the arm, the elastic element being so arranged to recall the sliding part towards a position causing the arm to tend to move radially outwards.

14. The internal inspection device according to claim 1, wherein the first position is triggered by the first positioning sensor and the second position is triggered by the second positioning sensor.

15. The internal inspection device according to claim 14, wherein the first positioning sensor triggers the first position when the first positioning sensor starts detecting an inside surface of the tubular good and the second positioning sensor triggers the second position when the second positioning sensor ends detecting an inside surface of the tubular good.

16. The internal inspection method of a tubular good, wherein an internal inspection device according to claim 1 is displaced inside the tubular good, a first position is triggered by the first positioning sensor, a second position is triggered by the second positioning sensor, a distance is measured by the displacement sensor and a length of the tubular good is calculated by adding the distance measured by the displacement sensor and a predetermined length.

* * * * *